(12) United States Patent
Cho

(10) Patent No.: US 12,335,120 B2
(45) Date of Patent: Jun. 17, 2025

(54) APPARATUS FOR MONITORING OTA ROM DATA AND METHOD THEREOF

(71) Applicants: Hyundai Motor Company, Seoul (KR); Kia Corporation, Seoul (KR)

(72) Inventor: Yong Woon Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 336 days.

(21) Appl. No.: 17/991,195

(22) Filed: Nov. 21, 2022

(65) Prior Publication Data

US 2024/0007374 A1    Jan. 4, 2024

(30) Foreign Application Priority Data

Jun. 29, 2022   (KR) .................. 10-2022-0079810

(51) Int. Cl.
*H04L 43/0823*    (2022.01)
*H04L 41/0631*    (2022.01)

(52) U.S. Cl.
CPC ...... *H04L 43/0847* (2013.01); *H04L 41/0631* (2013.01)

(58) Field of Classification Search
None
See application file for complete search history.

(56) References Cited

U.S. PATENT DOCUMENTS

| | | | | |
|---|---|---|---|---|
| 11,520,331 B2 * | 12/2022 | Baghsorkhi | .......... | G05D 1/0278 |
| 11,539,603 B2 * | 12/2022 | Fardid | .................. | G06F 8/65 |
| 11,622,257 B1 * | 4/2023 | Mars | .................. | H04W 12/75 |
| | | | | 455/41.2 |
| 11,644,834 B2 * | 5/2023 | Ditty | .................. | G06F 15/7807 |
| | | | | 701/23 |
| 11,647,217 B2 * | 5/2023 | Gondo | .................. | H04N 19/172 |
| | | | | 375/240.13 |
| 11,662,991 B2 * | 5/2023 | Yang | .................. | H04L 63/08 |
| | | | | 717/169 |
| 11,670,117 B2 * | 6/2023 | Shionoya | .............. | G07C 5/008 |
| | | | | 701/31.4 |
| 11,671,953 B2 * | 6/2023 | Shintani | ............ | H04N 21/4383 |
| | | | | 370/329 |
| 11,688,207 B2 * | 6/2023 | Levy | .................. | G07C 5/0808 |
| | | | | 701/31.4 |

(Continued)

FOREIGN PATENT DOCUMENTS

DE    102022106660 A1 *   10/2022   ............... G06F 8/65

*Primary Examiner* — Melvin H Pollack
(74) *Attorney, Agent, or Firm* — Fish & Richardson P.C.

(57) ABSTRACT

An apparatus for monitoring OTA ROM data to monitor whether there is an abnormality in the OTA ROM data using data of a network switch and a method thereof are provided. A monitoring device monitors information about data communication of each of ports of a network switch, in a process where OTA ROM data is transmitted to an OTA update target controller in a vehicle through the network switch. A controller determines whether there is an abnormality in the OTA ROM data, based on the monitored information about the data communication of each of the ports and information about communication processed by the network switch in the process where the OTA ROM data is transmitted to the OTA update target controller, which is predefined. The stability of the OTA update is improved.

18 Claims, 7 Drawing Sheets

(56) References Cited

U.S. PATENT DOCUMENTS

| | | | |
|---|---|---|---|
| 11,695,574 B2* | 7/2023 | Barrett | G06F 21/44 |
| | | | 713/158 |
| 11,711,255 B2* | 7/2023 | Dhelaria | G06F 11/3438 |
| | | | 709/224 |
| 11,818,129 B2* | 11/2023 | Zerrad | H04L 63/20 |
| 11,822,649 B2* | 11/2023 | Kerstein | H04L 63/1441 |
| 11,840,244 B2* | 12/2023 | Levy | B60W 50/045 |
| 11,910,346 B2* | 2/2024 | Beppler | H04W 76/11 |
| 11,928,458 B2* | 3/2024 | Abadie | G06F 8/65 |
| 11,928,899 B2* | 3/2024 | Singh | G01C 21/3415 |
| 11,985,238 B2* | 5/2024 | Yang | H04L 9/08 |
| 11,995,437 B2* | 5/2024 | Nagamitsu | G06F 8/65 |
| 12,001,829 B2* | 6/2024 | Sakai | G01C 21/3667 |
| 12,001,831 B2* | 6/2024 | Itatsu | B60R 16/02 |
| 12,010,131 B2* | 6/2024 | Patil | G06F 11/0793 |
| 12,015,922 B2* | 6/2024 | Davis | H04W 12/06 |
| 12,019,415 B2* | 6/2024 | Lu | G05B 19/042 |
| 12,050,903 B2* | 7/2024 | Ishikawa | H04W 4/40 |
| 12,058,034 B2* | 8/2024 | Rahman | H04L 45/28 |
| 12,058,148 B2* | 8/2024 | Sharifi Mehr | G06F 21/566 |
| 12,063,236 B2* | 8/2024 | Okano | G06F 21/554 |
| 12,074,915 B1* | 8/2024 | Di Jasio | H04L 63/0876 |
| 12,081,052 B2* | 9/2024 | Fuchs | B60L 53/305 |
| 12,093,397 B1* | 9/2024 | Lin | G06N 20/00 |
| 12,093,677 B2* | 9/2024 | Nagamitsu | G06F 8/65 |
| 12,099,825 B2* | 9/2024 | Ng | H04W 4/44 |
| 12,107,703 B2* | 10/2024 | Aiba | B60R 16/0231 |
| 12,110,034 B2* | 10/2024 | Itatsu | G06F 11/07 |
| 12,116,013 B2* | 10/2024 | Buerkle | G06Q 10/101 |
| 12,132,529 B2* | 10/2024 | Pon | H04L 69/08 |
| 12,135,960 B2* | 11/2024 | Ishikawa | G06F 8/65 |
| 12,137,346 B2* | 11/2024 | Christian | H04W 12/088 |
| 2022/0400068 A1* | 12/2022 | Lei | G01C 21/3407 |
| 2023/0367688 A1* | 11/2023 | Wang | G06F 11/3447 |
| 2023/0370338 A1* | 11/2023 | Shori | H04L 41/147 |
| 2024/0078119 A1* | 3/2024 | Lopez | G06F 9/44505 |
| 2024/0160414 A1* | 5/2024 | Toriumi | G07C 5/008 |
| 2024/0176755 A1* | 5/2024 | Uematsu | H04L 69/04 |
| 2024/0193953 A1* | 6/2024 | Matsukawa | G06Q 50/04 |

* cited by examiner

APPARATUS FOR MONITORING OTA ROM DATA AND METHOD THEREOF

CROSS-REFERENCE TO RELATED APPLICATION

This application claims the benefit of priority to Korean Patent Application No. 10-2022-0079810, filed in the Korean Intellectual Property Office on Jun. 29, 2022, the entire contents of which are incorporated herein by reference.

TECHNICAL FIELD

The present disclosure relates to an apparatus for monitoring over-the-air (OTA) read-only memory (ROM) data and a method thereof, and more particularly, relates to an apparatus for monitoring OTA ROM data to monitor whether there is an abnormality in the OTA ROM data using data of a network switch and a method thereof.

BACKGROUND

Recently, to additionally improve the marketability of a vehicle and enhance quality problems of the vehicle, an OTA technology for wirelessly transmitting and updating (reprogramming) control software (S/W), configuration information, tuning data, and the like to the vehicle by means of a server has been gradually introduced. Particularly, with the development of autonomous driving technology, the OTA technology has been activated mainly for updating an autonomous driving controller. An OTA reprogramming process may be composed of a process where the vehicle receives and stores update ROM data (OTA ROM data or a configuration file) through wireless communication from an external cloud server and transmits the updated ROM data to a controller to be updated to process an update command, after the vehicle is turned off. The update target controller may be connected with a network switch for Ethernet communication in such a process and may perform an update by means of update ROM data transmitted from a communication gateway which is an OTA management controller in the vehicle through the network switch. A network switch product provides statistical data for traffic for each port.

A conventional technology assumes that a data packet is not omitted or an abnormal packet is not injected in the OTA ROM data transmission process to perform communication through a network switch. Thus, there is a need to develop a technology for monitoring OTA ROM data transmitted through a network switch to diagnose a situation where a data packet is omitted or an abnormal packet is injected in the OTA ROM data transmission process.

SUMMARY

The present disclosure has been made to solve the above-mentioned problems occurring in the prior art while advantages achieved by the prior art are maintained intact.

An aspect of the present disclosure provides an apparatus for monitoring OTA ROM data to monitor whether there is an abnormality in the OTA ROM data using data of a network switch and a method thereof.

Another aspect of the present disclosure provides an apparatus for monitoring OTA ROM data to diagnose a situation where a data packet is omitted or an abnormal packet is injected in the OTA ROM data transmission process to improve the stability of an OTA update and a method thereof.

Another aspect of the present disclosure provides an apparatus for monitoring OTA ROM data to determine the pollution or data omission of OTA ROM data to improve the reliability of communication and a method thereof.

Another aspect of the present disclosure provides an apparatus for monitoring OTA ROM data to determine the injection of abnormal data by hacking in the OTA update process to improve the reliability of communication and a method thereof.

Another aspect of the present disclosure provides an apparatus for monitoring OTA ROM data to enhance the security of an OTA update and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for monitoring OTA ROM data may include a monitoring device that monitors information about data communication of each of ports of a network switch, in a process where the OTA ROM data is transmitted to an OTA update target controller in a vehicle through the network switch, storage that stores information about communication processed by the network switch in a process where the OTA ROM data is delivered to the OTA update target controller, the OTA ROM data being predefined, and a controller that determines whether there is an abnormality in the OTA ROM data, based on the monitored information about the data communication of each of the ports and the information stored in the storage.

In some implementations, the network switch may include an Ethernet switch used for Ethernet communication of the vehicle.

In some implementations, the monitoring device may monitor data packet traffic of each of the ports. The controller may determine whether there is an abnormality in the data packet traffic of each of the ports, based on the monitored information about the data communication of each of the ports and may determine whether there is the abnormality in the OTA ROM data depending on whether there is the abnormality in the data packet traffic of each of the ports.

In some implementations, the controller may calculate first reference data packet traffic for each of the ports, based on the information about the communication processed by the network switch in the process where the OTA ROM data is delivered to the OTA update target controller, the information being stored in the storage, and may compare the monitored data packet traffic of each of the ports with the calculated first reference data packet traffic for each of the ports to determine whether there is the abnormality in the data packet traffic of each of the ports, when the OTA ROM data is delivered to the OTA update target controller.

In some implementations, the storage may store information about at least one of a period when data is transmitted between software units of the OTA update target controller connected with each of the ports in the process where the predefined OTA ROM data is delivered or a size of the transmitted data. The controller may calculate the first reference data packet traffic for each of the ports, based on the information about the at least one of the period when the data is transmitted between the software units or the size of the transmitted data.

In some implementations, the storage may store information where data packet traffic when there is no abnormality in the OTA ROM data is defined for each of the ports. The controller may compare the monitored data packet traffic of each of the ports with the data packet traffic when there is no abnormality in the OTA ROM data stored in the storage to determine whether there is the abnormality in the data packet traffic of each of the ports.

In some implementations, the storage may store information where data packet traffic when there is an abnormality in the OTA ROM data is defined for each of the ports. The controller may compare the monitored data packet traffic of each of the ports with the data packet traffic when there is the abnormality in the OTA ROM data stored in the storage to determine whether there is the abnormality in the data packet traffic of each of the ports.

In some implementations, the controller may calculate second reference data packet traffic for each of the ports, the second reference data packet traffic corresponding to a situation where OTA ROM data is not delivered to the OTA update target controller, and may compare the monitored data packet traffic of each of the ports with the calculated second reference data packet traffic for each of the ports to determine whether there is an abnormality in communication of the network switch, when the OTA ROM data is not delivered to the OTA update target controller.

In some implementations, the controller may mirror and obtain information about a data packet transmitted and received by a port determined that there is the abnormality in the data packet traffic.

In some implementations, the controller may output information about the abnormality of the OTA ROM data by means of an output device provided in the vehicle, when it is determined that there is the abnormality in the OTA ROM data.

In some implementations, the controller may transmit information about the abnormality of the OTA ROM data to a server through a communication module provided in the vehicle, when it is determined that there is the abnormality in the OTA ROM data.

According to another aspect of the present disclosure, a method for monitoring OTA ROM data may include monitoring, by a monitoring device, information about data communication of each of ports of a network switch, in a process where the OTA ROM data is delivered to an OTA update target controller in a vehicle through the network switch, and determining, by a controller, whether there is an abnormality in the OTA ROM data, based on the monitored information about the data communication of each of the ports and information about communication processed by the network switch in the process where the OTA ROM data is delivered to the OTA update target controller, the OTA ROM data being stored in storage and being predefined.

In some implementations, the method may further include monitoring, by the monitoring device, data packet traffic of each of the ports. The determining of whether there is the abnormality in the OTA ROM data by the controller may include determining, by the controller, whether there is an abnormality in the data packet traffic of each of the ports, based on the monitored information about the data communication of each of the ports, and determining, by the controller, whether there is the abnormality in the OTA ROM data depending on whether there is the abnormality in the data packet traffic of each of the ports.

In some implementations, the method may further include calculating, by the controller, first reference data packet traffic for each of the ports, based on the information about the communication processed by the network switch in the process where the OTA ROM data is delivered to the OTA update target controller, the OTA ROM data being stored in the storage. The determining of whether there is the abnormality in the data packet traffic of each of the ports by the controller may include comparing, by the controller, the monitored data packet traffic of each of the ports with the calculated first reference data packet traffic for each of the ports to determine whether there is the abnormality in the data packet traffic of each of the ports, when the OTA ROM data is delivered to the OTA update target controller.

In some implementations, the calculating of the first reference data packet traffic for each of the ports by the controller may include calculating, by the controller, the first reference data packet traffic for each of the ports, based on information about at least one of a period when data is transmitted between software units of the OTA update target controller connected to each of the ports in the process where the OTA ROM data being stored in the storage and being predefined is delivered or a size of the transmitted data.

In some implementations, the determining of whether there is the abnormality in the data packet traffic of each of the ports by the controller may include comparing, by the controller, the monitored data packet traffic of each of the ports with data packet traffic when there is no abnormality in the OTA ROM data for each of the ports, the OTA ROM data being stored in the storage, to determine whether there is the abnormality in the data packet traffic of each of the ports.

In some implementations, the determining of whether there is the abnormality in the data packet traffic of each of the ports by the controller may include comparing, by the controller, the monitored data packet traffic of each of the ports with data packet traffic when there is an abnormality in the OTA ROM data for each of the ports, the OTA ROM data being stored in the storage, to determine whether there is the abnormality in the data packet traffic of each of the ports.

In some implementations, the method may further include calculating, by the controller, second reference data packet traffic for each of the ports, the second reference data packet traffic corresponding to a situation where the OTA ROM data is not delivered to the OTA update target controller, and comparing, by the controller, the monitored data packet traffic of each of the ports with the calculated second reference data packet traffic for each of the ports to determine whether there is an abnormality in communication of the network switch, when the OTA ROM data is not delivered to the OTA update target controller.

In some implementations, the method may further include mirroring and obtaining, by the controller, information about a data packet transmitted and received by a port determined that there is the abnormality in the data packet traffic.

In some implementations, the method may further include outputting, by the controller, information about the abnormality of the OTA ROM data by means of an output device provided in the vehicle, when it is determined that there is the abnormality in the OTA ROM data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
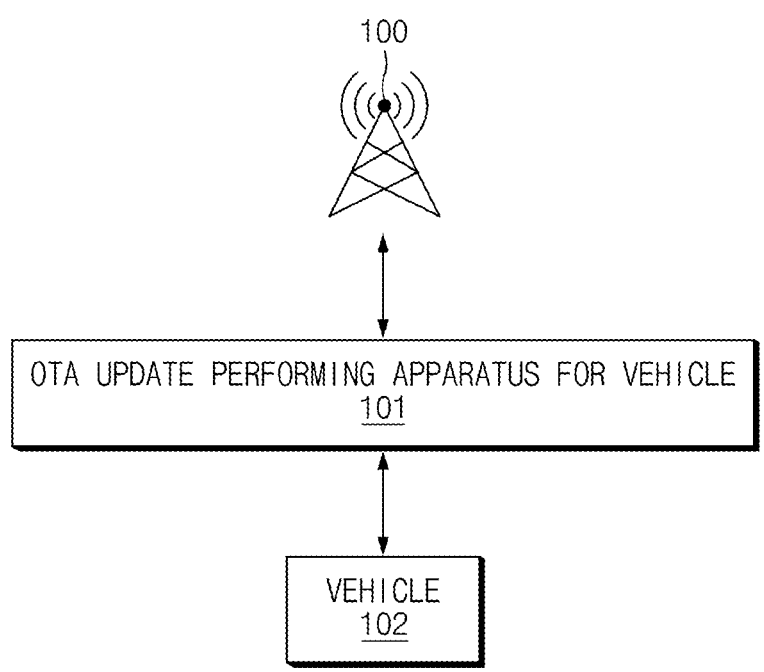
FIG. 1 illustrates an example of an environment where an over-the-air (OTA) update for vehicle is performed.

FIG. 1 illustrates an example of an environment where an over-the-air (OTA) update for vehicle is performed.

This drawing is a drawing for describing an example of an environment where an apparatus for monitoring OTA ROM data operates.

An OTA update may be performed by an OTA update performing apparatus 100 for vehicle (or an apparatus).

In this drawing, the apparatus is illustrated as being located outside a vehicle 102, but may be located inside the vehicle 102.

The vehicle 102 may include at least one of an electric vehicle (EV), a hybrid electric vehicle (HEV), and/or a plug-in hybrid electric vehicle (PHEV).

The OTA update may indicate a scheme of updating software of the vehicle using a wireless communication network.

In general, the software of the vehicle may be executed by wiredly connecting a storage device storing data for a software update with the vehicle. Herein, as a communication technology is developed, it is possible for the vehicle to directly receive and update data for a software update using the wireless communication network. The OTA update may indicate updating firmware of the vehicle, using a wireless communication network (e.g., wireless-fidelity (Wi-Fi)), without connecting the vehicle with the above-mentioned storage device (e.g., a computer).

Furthermore, the OTA update may use a scheme of updating a portion changed in existing firmware of the vehicle. In other words, the OTA update may fail to perform an update (e.g., firmware full change) of all of the firmware of the vehicle.

The OTA update may be referred to as a vehicle firmware update, a firmware over-the-air (FOTA) update, a vehicle software update, or the like. The method of calling the OTA update is not limited to the above-mentioned example.

The apparatus may receive information for an OTA update (or data for the above-mentioned software update) from a sever. The information for the OTA update may be information for performing the above-mentioned OTA update. For example, the information for the OTA update may include software package information, software version information, vehicle identification number (VIN) information, or the like.

The apparatus may perform an OTA update of the vehicle 102 based on the information for the OTA update, which is received from the server. In other words, the apparatus may compare the information for the OTA update, which is received from the server, with information about software of the vehicle 102 to perform an OTA update. For example, when software version information received from the server and software version information of an electronic control unit (ECU) included in the vehicle 102 are different from each other, the apparatus may determine to perform an OTA update.

In some implementations, the vehicle 102 may include one or more ECUs. The ECU may indicate an electronic device which is included in the vehicle 102 to perform a specific function. For example, the ECU may indicate an anti-lock braking system (ABS) ECU, a traction control system (TCS) ECU, a vehicle dynamic control (VDC) ECU, a tire pressure monitoring system (TPMS) ECU, an air flow sensor (AFS) ECU, or a throttle position sensor (TPS) ECU. The ECU is not limited to the above-mentioned examples.

The OTA update may be performed for each of the above-mentioned ECUs. In other words, the OTA update performed by the apparatus may be performed independently of each ECU or may be performed collectively for all of ECUs included in the vehicle 102. For example, the apparatus may perform an OTA update for only the ABS ECU included in the vehicle 102.

The apparatus may wirelessly update software (or firmware) of ECU(s) included in the vehicle 102, by means of the OTA update described in the drawing. In other words, the apparatus may update software of the ECU in the above-mentioned OTA scheme, thus adding a new function to the ECU, enhancing an existing error of the ECU, and/or strengthen the security of the ECU.

Figure 2:
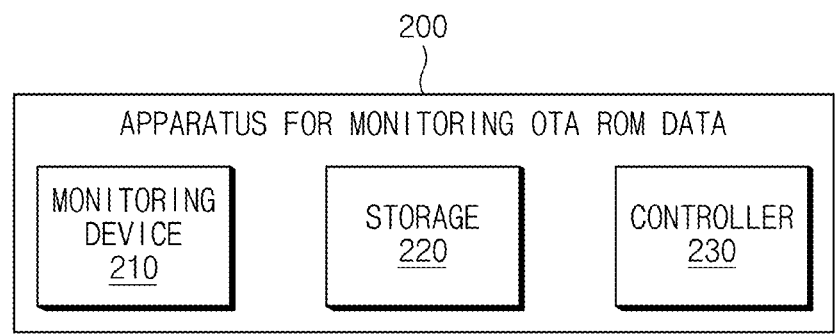
FIG. 2 is a block diagram illustrating an apparatus for monitoring OTA ROM data.

FIG. 2 is a block diagram illustrating an apparatus for monitoring OTA ROM data according to some implementations of the present disclosure.

An apparatus 200 for monitoring OTA ROM data according to some implementations of the present disclosure may be implemented inside or outside a vehicle. In this case, the apparatus 200 for monitoring the OTA ROM data may be integrally configured with control units in the vehicle or may be implemented as a separate hardware device to be connected with the control units of the vehicle by a connection means.

As an example, the apparatus 200 for monitoring the OTA ROM data may be integrally configured with the vehicle or may be implemented as a separate configuration independent of the vehicle in the form of being installed/attached to the vehicle. Alternatively, a part of the apparatus 200 for monitoring the OTA ROM data may be integrally configured with the vehicle and the other may be implemented as a separate configuration independent of the vehicle in the form of being installed/attached to the vehicle.

Referring to FIG. 2, the apparatus 200 for monitoring the OTA ROM data may include a monitoring device 210, storage 220, and a controller 230.

The monitoring device 210 may monitor information about data communication of each of ports of a network switch, in a process where the OTA ROM data is transmitted to an OTA update target controller in the vehicle through the network switch.

As an example, the network switch may include an Ethernet switch used for Ethernet communication of the vehicle.

As an example, the monitoring device 210 may monitor information about data communication of each of ports of the network switch, depending on the request of the controller 230.

As an example, the monitoring device 210 may monitor data packet traffic of each of the ports of the network switch or a state of the communicated packet.

As an example, the monitoring device 210 may obtain information about a transmit packet counter for each port of the network switch, a receive packet counter for each port of the network switch, and/or an abnormal or omitted packet counter.

As an example, the monitoring device 210 may monitor information about data communication of each of the ports of the network switch, in a manner of receiving the information about the transmit packet counter, the receive packet counter, and/or the abnormal or omitted packet counter from each port of the network switch.

As another example, the monitoring device 210 may be connected with each port of the network switch and may monitor information about data communication of each of the ports of the network switch, in a manner of directly counting the number of transmit packets of each port, the number of receive packets of each port, and/or the number of abnormal or omitted packets of each port.

The monitoring device 210 may be directly or indirectly connected with the controller 230 through wireless or wired communication to deliver the monitored information to the controller 230.

The storage 220 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The storage 220 may store information about communication processed by the network switch in the process where the OTA ROM data is delivered to the OTA update target controller, which is predefined.

Furthermore, the storage 220 may store information about communication processed by the predefined network switch for a general case except for the case where the OTA ROM data is delivered to the OTA update target controller.

The information about the communication processed by the network switch, which is stored in the storage 220, may be information defined based on statistical data or statistical information.

The information about the communication processed by the network switch, which is stored in the storage 220, may include information about communication processed by the network switch when normal communication is performed and information about communication processed by the network switch when abnormal communication is performed.

As an example, the storage 220 may store information about at least one of a period when data is transmitted between software units of the OTA update target controller connected with each of the ports of the network switch in a process where the predefined OTA ROM data is delivered or a size of the transmitted data.

As an example, the storage 220 may store information where traffic when there is no abnormality in the OTA ROM data and when there is an abnormality in the OTA ROM data is defined for each of the ports of the network switch.

Herein, the traffic may be determined on the basis of the number of transmitted and received data packets.

As an example, the information stored in the storage 220 may be stored when the apparatus is manufactured.

As another example, the information stored in the storage 220 may be received from a server to be stored and updated. As another example, the information stored in the storage 220 may be updated by the controller 230.

The controller 230 may perform the overall control such that respective components may normally perform their own functions. Such a controller 230 may be implemented in the form of hardware, may be implemented in the form of software, or may be implemented in the form of a combination thereof. Preferably, the controller 230 may be implemented as, but not limited to, a microprocessor. In addition, the controller 230 may perform a variety of data processing, calculation, and the like described below.

The controller 230 may include a processor which performs data processing and/or calculation described below. Furthermore, the controller 230 may include a memory which stores data or an algorithm for a process of performing data processing and/or calculation.

The processor which may be included in the controller 230 may be an electric circuit which executes a command of software. For example, the processor included in the controller 230 may be an electronic control unit (ECU), a micro controller unit (MCU), or another sub-controller.

The memory which may be included in the controller 230 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The controller 230 may determine whether there is an abnormality in the OTA ROM data, based on the monitored information about the data communication of each of the ports of the network switch and the information stored in the storage 220. The controller 230 may determine whether some data packets are omitted or whether some data packets are injected by hacking, while OTA ROM data is transmitted. Hereinafter, a meaning of abnormality of OTA ROM data may comprise error or omission of data packets in the transmission process, and injection of data packets by hacking.

As an example, the controller 230 may determine whether there is an abnormality in data packet traffic of each of the ports of the network switch, based on the monitored information about the data communication of each of the ports of the network switch, and may determine that there is the abnormality in the OTA ROM data, when there is the abnormality in data packet traffic of each of the ports of the network switch.

As an example, the controller 230 may subtract the number of omitted or abnormal data packets among the transmitted data packets from the number of the transmitted data packets with respect to each of the ports of the network switch to determine the number of normal packets transmitted by each of the ports of the network switch.

Furthermore, similarly, the controller 230 may subtract the number of omitted or abnormal data packets among the received data packets from the number of the received data packets with respect to each of the ports of the network switch to determine the number of normal packets received by each of the ports of the network switch.

As an example, the controller 230 may determine whether there is an abnormality in the data packet traffic, based on the number of the normal packets transmitted or received by each of the ports of the network switch.

When there is the abnormality in the data packet traffic of each of the ports of the network switch, there may be a situation where some data packets are omitted in the transmission process or where an abnormal data packet is injected by hacking.

As an example, the controller 230 may calculate first reference data packet traffic for each of the ports of the network switch, based on the information about the communication processed by the network switch in the process where the OTA ROM data is delivered to the OTA update target controller, which is stored in the storage 220.

The first reference data packet traffic may be defined as a value which is a criterion of data packet traffic transmitted or received in each port in a situation high-capacity communication is performed as the OTA ROM data is transmitted to the OTA update target controller.

The first reference data packet traffic may include a first reference transmission packet amount and a first reference reception packet amount for each port.

In detail, the controller 230 may calculate the first reference data packet traffic for each of the ports of the network switch, based on the information about the at least one of the period when the data is transmitted between the software units or the size of the transmitted data.

As an example, the controller 230 may calculate the first reference data packet traffic, based on a statistical representative value for at least one of a period when data is transmitted between software units of the OTA update target controller connected in response to each port in an OTA ROM data transmission situation where normal communication is performed or a size of the transmitted data.

As an example, when the OTA ROM data is delivered to the OTA update target controller, the controller 230 may compare the monitored data packet traffic of each of the ports with the calculated first reference data packet traffic for each of the ports to determine whether there is the abnormality in the data packet traffic of each of the ports.

As an example, the controller 230 may determine a situation where the OTA ROM data is delivered to the OTA update target controller, depending on whether the OTA update is prepared and the vehicle is turned off.

As another example, the controller 230 may determine a situation where the OTA ROM data is delivered to the OTA update target controller, by means of the signal output from the OTA update performing apparatus.

As an example, when a difference between the monitored data packet traffic of each of the ports and the calculated first reference data packet traffic for each of the ports is greater than a predetermined threshold, the controller 230 may determine that there is the abnormality in the data packet traffic of each of the ports.

As an example, the controller 230 may calculate second reference data packet traffic for each of the ports, which corresponds to a situation where the OTA ROM data is not delivered to the OTA update target controller.

The second reference data packet traffic may be defined as a value which is a criterion of data packet traffic transmitted or received in each port in a general situation rather than the situation the high-capacity communication is performed as the OTA ROM data is transmitted to the OTA update target controller.

The second reference data packet traffic may include a second reference transmission packet amount and a second reference reception packet amount for each port.

As an example, the controller 230 may calculate the second reference data packet traffic, based on a statistical representative value for at least one of a period when data is transmitted between software units of the OTA update target controller connected in response to each port in a general situation where normal communication is performed or a size of the transmitted data.

As another example, the controller 230 may use information about the second reference data packet traffic, which is previously stored in the storage 220, without change.

As an example, when the OTA ROM data is not delivered to the OTA update target controller, the controller 230 may compare the monitored data packet traffic of each of the ports with the calculated second reference data packet traffic for each of the ports to determine whether there is an abnormality in communication of the network switch.

As an example, when a difference between the monitored data packet traffic of each of the ports and the calculated second reference data packet traffic for each of the ports is greater than a predetermined threshold, the controller 230 may determine that there is the abnormality in the communication of the network switch.

As another example, the controller 230 may compare the monitored data packet traffic of each of the ports with data packet traffic when there is no abnormality in the OTA ROM data stored in the storage 220 to determine whether there is the abnormality in the data packet traffic of each of the ports.

As an example, when a difference between the monitored data packet traffic of each of the ports and the data packet traffic when there is no abnormality in the OTA ROM data stored in the storage 220 is greater than the predetermined threshold, the controller 230 may determine that there is the abnormality in the data packet traffic of each of the ports.

As another example, the controller 230 may compare the monitored data packet traffic of each of the ports with data packet traffic when there is the abnormality in the OTA ROM data stored in the storage 220 to determine whether there is the abnormality in the data packet traffic of each of the ports.

As an example, when the difference between the monitored data packet traffic of each of the ports and the data packet traffic when there is the abnormality in the OTA ROM data stored in the storage 220 is less than the predetermined threshold, the controller 230 may determine that there is the abnormality in the data packet traffic of each of the ports.

As an example, the controller 230 may mirror and obtain information about a data packet transmitted and received by the port determined that there is the abnormality in the data packet traffic.

As an example, the controller 230 may set a data movement path in the network switch such that a data packet transmitted and/or received by the port determined that there is the abnormality in the data packet traffic is copied to a mirroring port.

The controller 230 may receive information about the copied data packet from the mirroring port and may store the received information in the storage 220 or a separate memory.

The information about the data packet received from the mirroring port may be used for debugging.

As an example, the controller 230 may update information where traffic when there is an abnormality in the OTA ROM data stored in the storage 220 is defined, by means of information about a data packet for an abnormal situation, which is received from the mirroring port.

As an example, when it is determined that there is the abnormality in the OTA ROM data, the controller 230 may output information about the abnormality in the OTA ROM data by means of an output device provided in the vehicle.

The output device provided in the vehicle may include a cluster, audio, video, navigation (AVN), a head-up display (HUD), or the like.

As an example, the controller 230 may output the information about the abnormality in the OTA ROM data as a visual or audible signal by means of the output device provided in the vehicle.

As an example, when it is determined that there is the abnormality in the OTA ROM data, the controller 230 may transmit the information about the abnormality in the OTA ROM data to a server by means of a communication module provided in the vehicle.

The communication module provided in the vehicle may communicate with the server by means of a wireless-fidelity (Wi-Fi) scheme, a Bluetooth scheme, a ZigBee scheme, an ultra-wide band (UWB) scheme, a near field communication (NFC) scheme, or the like.

Figure 3:
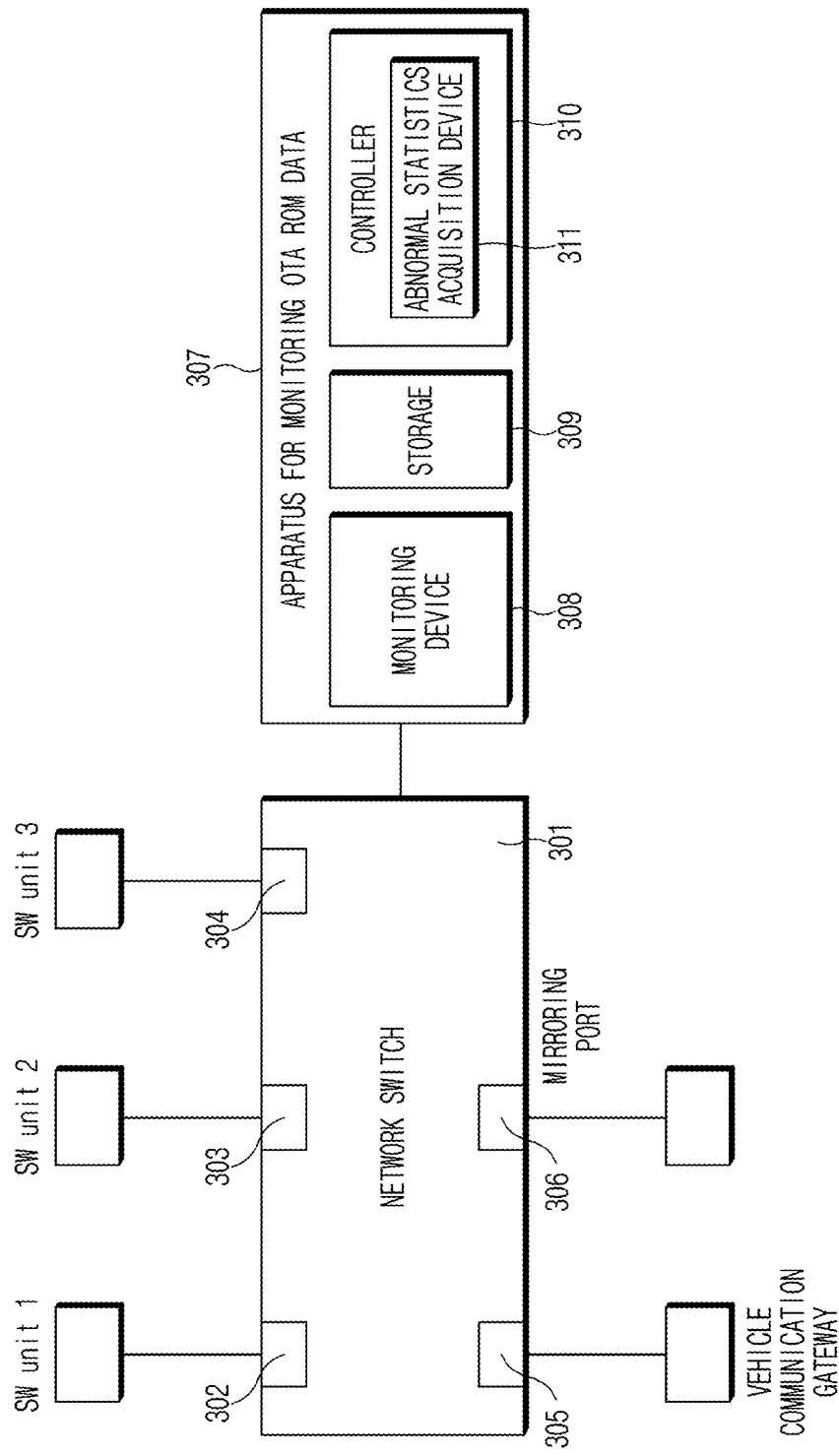
FIG. 3 illustrates an apparatus for monitoring OTA ROM data and a network switch.

FIG. 3 illustrates an apparatus for monitoring OTA ROM data and a network switch according to some implementations of the present disclosure.

Referring to FIG. 3, a network switch 301 may include one or more ports 302, 303, 304, 305, and 306.

Some 302, 303, and 304 of the ports of the network switch 301 may be connected with different software units of an OTA update target controller.

The OTA update target controller may be, but is not limited to, an autonomous driving controller.

The software unit of the OTA update target controller may include an MCU, a central processing unit (CPU), a vision processing unit (VPN), or the like of the OTA update target controller.

The network switch 301 may include a port 305 connected with a vehicle communication gateway which is an OTA management controller and a mirroring port 306.

The network switch 301 may perform data packet transmission processing for transmitting OTA ROM data to the OTA update target controller.

The packet may be composed of a MAC/IP address and a payload.

The network switch 301 may transmit a packet to a path according to a destination address of the packet input from each port.

In this process, OTA ROM data may be received from the port 305 connected with the vehicle communication gateway.

Furthermore, in this process, a data packet may be transmitted and received between software units of the OTA update target controller.

An apparatus 307 for monitoring OTA ROM data may include a monitoring device 308, storage 309, and a controller 310.

The controller 310 may include an abnormal statistics acquisition device 311.

The apparatus 307 for monitoring the OTA ROM data may be connected with the network switch 301.

The monitoring device 308 may obtain information about a data packet transmitted and received by each of the ports 302 to 306 from the network switch 301.

The monitoring device 308 may obtain information about the number of data packets transmitted and received by each of the ports 302 to 306 from the network switch 301.

The storage 309 may include a database in which a period of data transmitted and received between the software units of the OTA update target controller, a size of a payload, or the like is recorded.

The controller 310 may determine whether there is an abnormality in communication of the network switch 301, based on the information stored in the storage 309 and the information obtained by means of the monitoring device 308.

When it is determined that there is the abnormality in the communication of the network switch 301, the abnormal statistics acquisition device 311 may set a path such that a data packet transmitted and received by an abnormal port is mirrored through the mirroring port 306.

Figure 4:
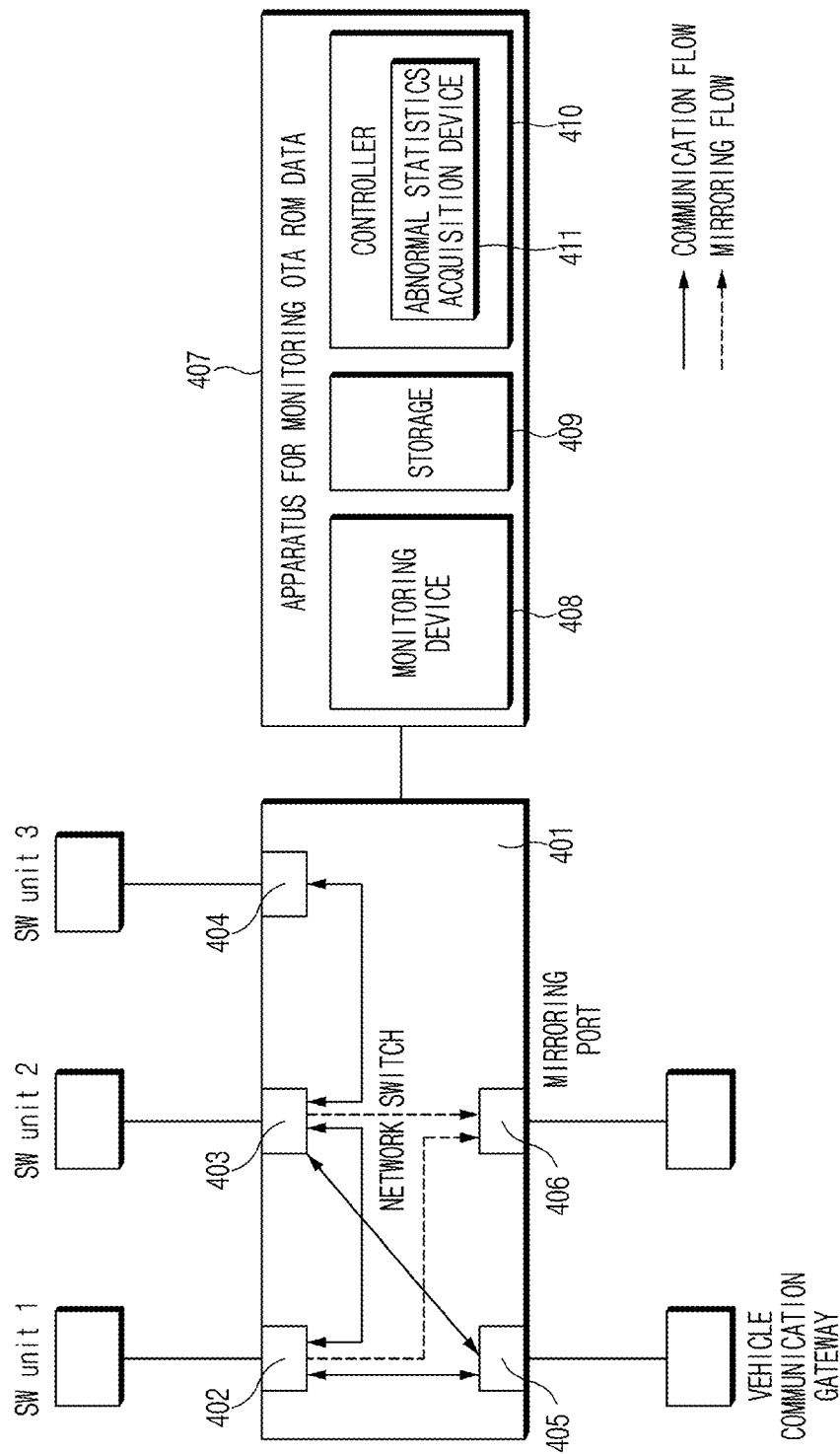
FIG. 4 is a drawing illustrating data packet flow between an apparatus for monitoring OTA ROM data and a network switch.

FIG. 4 is a drawing illustrating data packet flow between an apparatus for monitoring OTA ROM data and a network switch according to some implementations of the present disclosure.

Components 401 to 411 of FIG. 4 may include all of features described for components 301 to 311 of FIG. 3.

It may be assumed that OTA ROM data input through a port 405 connected with a vehicle communication gateway is delivered to a port 402 connected with software unit 1 and a port 403 connected with software unit 2.

Furthermore, it may be assumed that data is transmitted and received between the port 402 connected with software unit 1 and the port 403 connected with software unit 2 and that data is transmitted and received between the port 403 connected with software unit 2 and a port 404 connected with software unit 3.

At this time, a monitoring device 408 may monitor information about a data packet amount transmitted and received through the ports 402, 403, and 404 connected with the software units of an OTA update target controller.

A controller 410 may determine whether there is an abnormality in communication through the ports 402, 403, and 404 connected with the software units, based on information stored in storage 409 and the information about the data packet amount transmitted and received through the ports 402, 403, and 404 connected with the software units of the OTA update target controller, which is obtained by means of the monitoring device 408.

As an example, when it is determined that there is the abnormality, it may be assumed that there is the abnormality in communication through the port 402 connected with software unit 1 and the port 403 connected with software unit 2.

At this time, an abnormal statistics acquisition device 411 may set a mirroring path such that a data packet transmitted and received by the port 402 connected with software unit 1 and the port 403 connected with software unit 2 is mirrored through the mirroring port 406.

When there are two or more abnormal ports, the abnormal statistics acquisition device 411 may set a mirroring path such that the data packet is sequentially mirrored through the mirroring port 406 for the two or more ports.

Illustratively, the abnormal statistics acquisition device 411 may set a mirroring path such that a data packet transmitted and received by the port 402 connected with software unit 1 is first mirrored through the mirroring port 406.

When information about the data packet transmitted and received by the port 402 connected with software unit 1 is sufficiently obtained, the abnormal statistics acquisition device 411 may set a mirroring path such that a data packet transmitted and received by the port 403 connected with software unit 2 is mirrored through the mirroring port 406.

The monitoring device 408 may obtain information about data mirrored through the mirroring port 406.

The controller 410 may store the mirrored data in the storage 409 or may transmit the mirrored data to a server to be used for debugging or statistical information acquisition.

Figure 5:
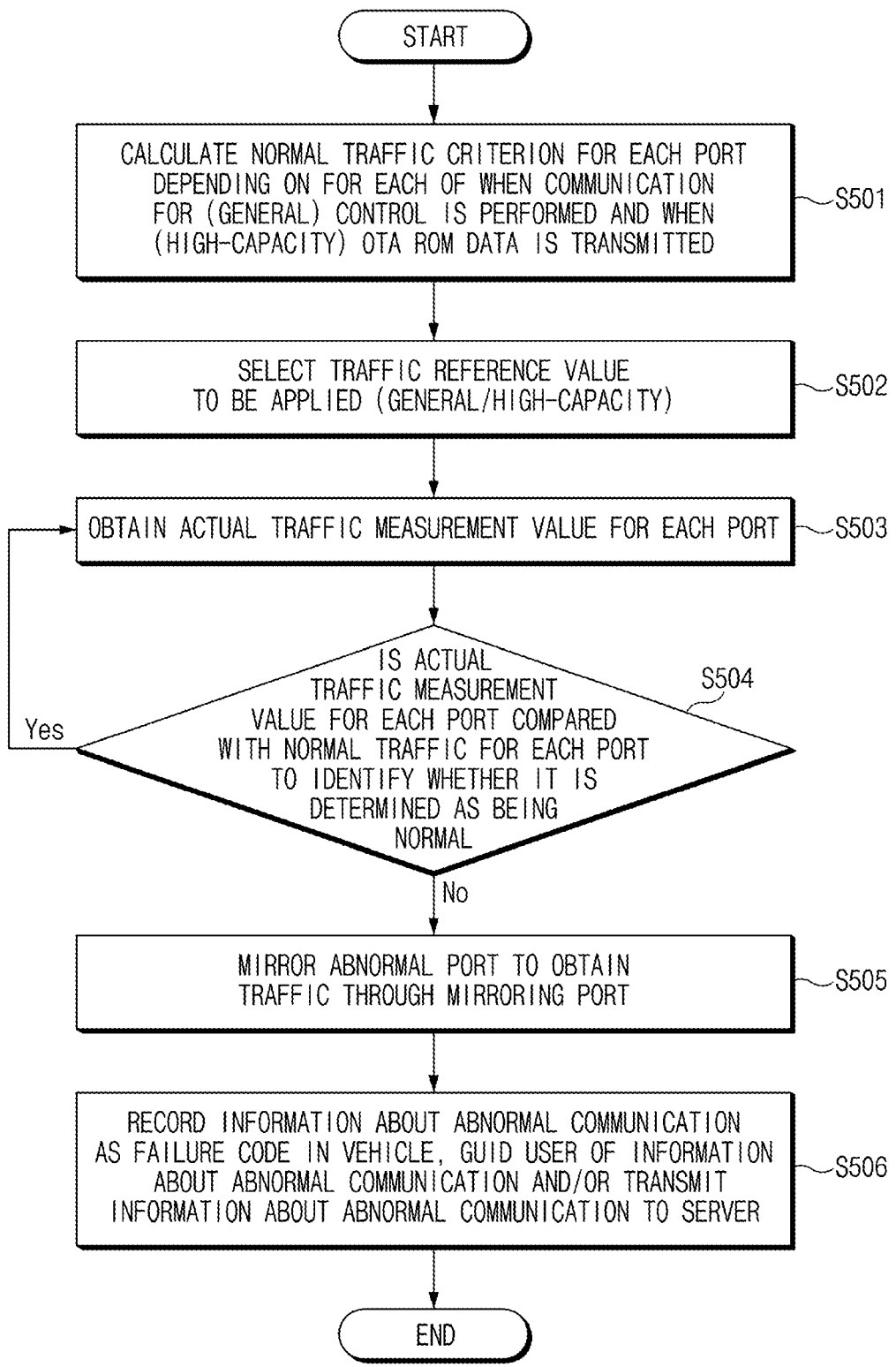
FIG. 5 is a flowchart illustrating an operation of an apparatus for monitoring OTA ROM data.

FIG. 5 is a flowchart illustrating an operation of an apparatus for monitoring OTA ROM data according to some implementations of the present disclosure.

Hereinafter, it is assumed that an apparatus 200 for monitoring OTA ROM data in FIG. 2 performs a process of FIG. 5.

Referring to FIG. 5, in S501, an apparatus for monitoring OTA ROM data may calculate a normal traffic criterion for each port for each of when general control is performed and when OTA ROM data is transmitted.

As an example, the apparatus for monitoring the OTA ROM data may calculate reference traffic for each port, based on statistical information about traffic for each port for each of when the general control is performed and when the OTA ROM data is transmitted.

In S502, the apparatus for monitoring the OTA ROM data may select a traffic reference value to be applied.

As an example, the apparatus for monitoring the OTA ROM data may determine whether there is a situation where OTA ROM data is currently transmitted through a network switch and may determine reference traffic to be applied depending on the determined result.

In S503, the apparatus for monitoring the OTA ROM data may obtain actual traffic measurement value for each port.

As an example, the apparatus for monitoring the OTA ROM data may obtain information about the number of data packets transmitted and/or received for each port of the network switch.

In S504, the apparatus for monitoring the OTA ROM data may compare the obtained actual traffic measurement value for each port with normal traffic for each port to identify whether the obtained actual traffic measurement value for each port is determined as being normal.

As an example, when a difference between the obtained actual traffic measurement value for each port and the normal traffic for each port is not greater than a predetermined threshold, the apparatus for monitoring the OTA ROM data may determine that the obtained actual traffic measurement value for each port is normal.

When it is determined that the obtained actual traffic measurement value for each port is normal, the apparatus for monitoring the OTA ROM data may return to S503 to obtain an actual traffic measurement value for each port.

When it is determined that the obtained actual traffic measurement value for each port is not normal, in S505, the apparatus for monitoring the OTA ROM data may mirror an abnormal port and may obtain information about traffic of the abnormal port through a mirroring port.

As an example, the apparatus for monitoring the OTA ROM data may sequentially mirror a data packet transmitted and received by a port determined that abnormal communication is performed to the mirroring port and may obtain information about the data packet mirrored to the mirroring port.

In S506, the apparatus for monitoring the OTA ROM data may record the information about the abnormal communication as a failure code in a vehicle, may guide the user of the information about the abnormal communication, and/or may transmit the information about the abnormal communication to a server.

As an example, the apparatus for monitoring the OTA ROM data may store information about the mirrored data packet of the abnormal port together with the failure code in the vehicle in a memory.

As an example, the apparatus for monitoring the OTA ROM data may guide the user of contents that an error in the transmission of OTA ROM data occurs by means of an output device.

As an example, the apparatus for monitoring the OTA ROM data may transmit the information about the data packet of the abnormal packet to the server such that the information about the data packet of the abnormal port may be used in a debugging process.

Figure 6:
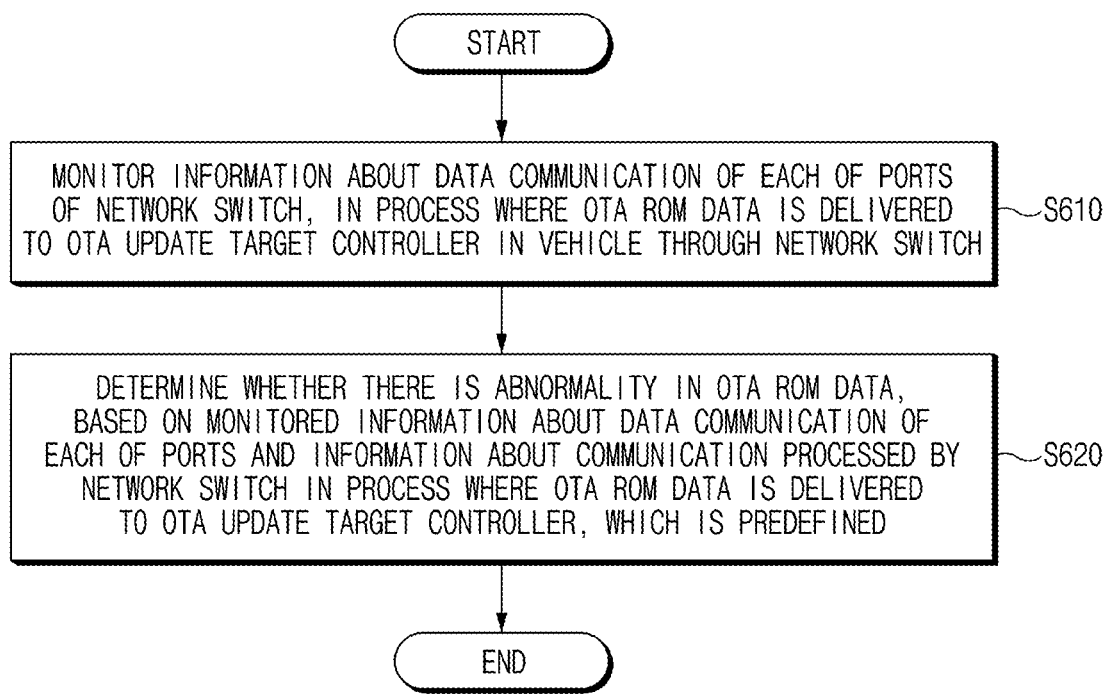
FIG. 6 is a flowchart illustrating a method for monitoring OTA ROM data.

FIG. 6 is a flowchart illustrating a method for monitoring OTA ROM data according to some implementations of the present disclosure.

Referring to FIG. 6, the method for monitoring the OTA ROM data may include monitoring (S610) information about data communication of each of ports of a network switch, in a process where the OTA ROM data is delivered to an OTA update target controller in a vehicle through the network switch and determining (S620) whether there is an abnormality in the OTA ROM data, based on the monitored information about the data communication of each of the ports and information about communication processed by the network switch in the process where the OTA ROM data is delivered to the OTA update target controller, which is predefined.

The monitoring (S610) of the information about the data communication of each of the ports of the network switch, in the process where the OTA ROM data is delivered to the OTA update target controller in the vehicle through the network switch may be performed by a monitoring device.

The determining (S620) of whether there is the abnormality in the OTA ROM data, based on the monitored information about the data communication of each of the ports and the information about the communication processed by the network switch in the process where the OTA ROM data is delivered to the OTA update target controller, which is predefined, may be performed by a controller.

As an example, the method for monitoring the OTA ROM data may further include monitoring, by the monitoring device, data packet traffic of each of the ports.

As an example, the determining (S620) of whether there is the abnormality in the OTA ROM data by the controller may include determining, by the controller, whether there is an abnormality in data packet traffic of each of the ports, based on the monitored information about the data communication of each of the ports, and determining, by the controller, whether there is the abnormality of in the OTA ROM data depending on whether there is the abnormality in the data packet traffic of each of the ports.

As an example, the method for monitoring the OTA ROM data may further include calculating, by the controller, first reference data packet traffic for each of the ports, based on the information about the communication processed by the network switch in the process where the OTA ROM data is delivered to the OTA update target controller, which is stored in storage.

As an example, the determining of whether there is the abnormality in the data packet traffic of each of the ports by the controller may include comparing the monitored data packet traffic of each of the ports with the calculated first reference data packet traffic for each of the ports to determine whether there is the abnormality in the data packet traffic of each of the ports, when the OTA ROM data is delivered to the OTA update target controller.

As an example, the calculating of the first reference data packet traffic for each of the ports by the controller may include calculating, by the controller, the first reference data packet traffic for each of the ports, based on information about at least one of a period when data is transmitted between software units of the OTA update target controller connected to each of the ports in the process the OTA ROM data which is stored in the storage and is predefined or a size of the transmitted data.

As an example, the determining of whether there is the abnormality in the data packet traffic of each of the ports by the controller may include comparing, by the controller, the monitored data packet traffic of each of the ports with data packet traffic when there is no abnormality in the OTA ROM data for each of the ports, which is stored in the storage, to determine whether there is the abnormality in the data packet traffic of each of the ports.

As an example, the determining of whether there is the abnormality in the data packet traffic of each of the ports by the controller may include comparing, by the controller, the monitored data packet traffic of each of the ports with data packet traffic when there is an abnormality in the OTA ROM data for each of the ports, which is stored in the storage, to determine whether there is the abnormality in the data packet traffic of each of the ports.

As an example, the method for monitoring the OTA ROM data may further include calculating, by the controller, second reference data packet traffic for each of the ports, which corresponds to a situation where the OTA ROM data is not delivered to the OTA update target controller, and comparing, by the controller, the monitored data packet traffic of each of the ports with the calculated second reference data packet traffic for each of the ports to determine whether there is an abnormality in communication of the network switch, when the OTA ROM data is not delivered to the OTA update target controller.

As an example, the method for monitoring the OTA ROM data may further include mirroring and obtaining, by the controller, information about a data packet transmitted and received by a port determined that there is the abnormality in the data packet traffic.

As an example, the method for monitoring the OTA ROM data may further include outputting, by the controller, information about the abnormality in the OTA ROM data by means of an output device provided in the vehicle, when it is determined that there is the abnormality in the OTA ROM data.

Figure 7:
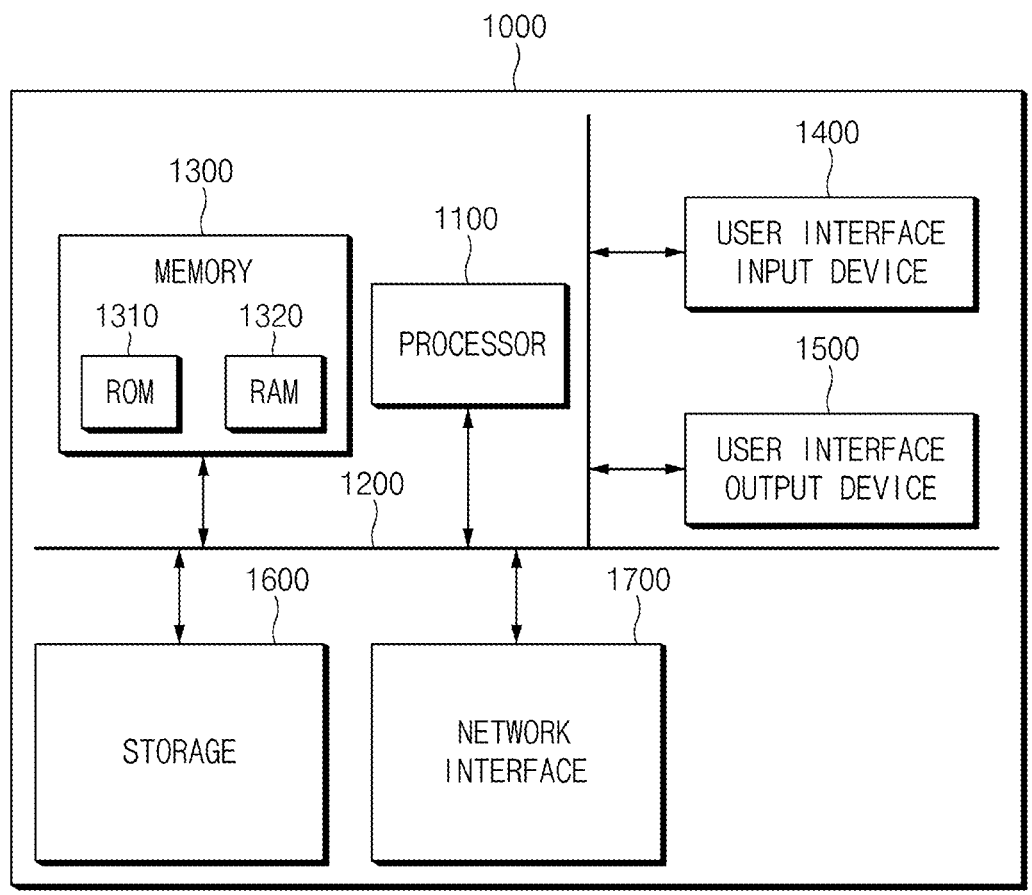
FIG. 7 is a block diagram illustrating a computing system.

FIG. 7 is a block diagram illustrating a computing system according to some implementations of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the implementations disclosed herein may be implemented directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the apparatus for monitoring the OTA ROM data and the method thereof according to some implementations of the present disclosure.

In some implementations, the apparatus for monitoring the OTA ROM data and the method thereof may be provided to monitor whether there is an abnormality in the OTA ROM data using data of a network switch.

In some implementations, the apparatus for monitoring the OTA ROM data and the method thereof may be provided to diagnose a situation where a data packet is omitted or an abnormal packet is injected in the OTA ROM data transmission process to improve the stability of an OTA update.

In some implementations, the apparatus for monitoring the OTA ROM data and the method thereof may be provided to determine the pollution or data omission of OTA ROM data to improve the reliability of communication.

In some implementations, the apparatus for monitoring the OTA ROM data and the method thereof may be provided to determine the injection of abnormal data by hacking in the OTA update process to improve the reliability of communication.

In some implementations, the apparatus for monitoring the OTA ROM data and the method thereof may be provided to enhance the security of an OTA update.

What is claimed is:

1. An apparatus for monitoring over-the-air (OTA) read-only memory (ROM) data, the apparatus comprising:
   a monitoring device configured to, based on the OTA ROM data being transmitted to an OTA update target controller in a vehicle through a network switch, monitor a traffic measurement value of each of one or more ports of the network switch;
   a storage configured to, based on the OTA ROM data being delivered to the OTA update target controller, store information regarding communication processed by the network switch, the OTA ROM data being predefined; and
   a controller configured to determine a presence of an abnormality in the OTA ROM data, based on the monitored traffic measurement value of each of the one or more ports and the information stored in the storage, and
   wherein the controller is configured to:
   determine reference traffic for each port based on the information regarding communication processed by the network switch; and
   determine a presence of an abnormality in data packet traffic of each of the one or more ports by comparing the traffic measurement value and the reference traffic to thereby determine the presence of the abnormality in the OTA ROM data.

2. The apparatus of claim 1, wherein the network switch is configured to include an Ethernet switch used for Ethernet communication of the vehicle.

3. The apparatus of claim 1, wherein the controller is configured to:

calculate first reference data packet traffic for each of the one or more ports, based on the information regarding the communication processed by the network switch, the information being stored in the storage; and determine the first reference data packet traffic as the reference traffic.

4. The apparatus of claim 3, wherein the storage is configured to store information regarding at least one of (i) a period when data is transmitted between software units of the OTA update target controller connected with each of the one or more ports or (ii) a size of the transmitted data, and wherein the controller is configured to calculate the first reference data packet traffic for each of the one or more ports, based on the information regarding the at least one of the period or the size of the transmitted data.

5. The apparatus of claim 1, wherein the storage is configured to store first information that defines data packet traffic when the abnormality is not present in the OTA ROM data, and wherein the controller is configured to determine the reference traffic based on the first information.

6. The apparatus of claim 1, wherein the storage is configured to store second information that defines data packet traffic when the abnormality is present in the OTA ROM data, and wherein the controller is configured to determine the reference traffic based on the second information.

7. The apparatus of claim 1, wherein the controller is configured to:

calculate, based on the OTA ROM data not being delivered to the OTA update target controller, second reference data packet traffic for each of the one or more ports; and determine the second reference data packet traffic as the reference traffic.

8. The apparatus of claim 1, wherein the controller is configured to mirror and obtain information regarding a data packet transmitted and received by a port at which the abnormality in the data packet traffic is determined to be present.

9. The apparatus of claim 1, wherein the controller is configured to, based on a determination that the abnormality is present in the OTA ROM data, output information regarding the abnormality of the OTA ROM data using an output device provided in the vehicle.

10. The apparatus of claim 1, wherein the controller is configured to, based on a determination that the abnormality is present in the OTA ROM data, transmit information regarding the abnormality of the OTA ROM data to a server through a communication module provided in the vehicle.

11. A method for monitoring over-the-air (OTA) read-only memory (ROM) data, the method comprising:

monitoring, based on the OTA ROM data being transmitted to an OTA update target controller in a vehicle through a network switch, a traffic measurement value of each of one or more ports of the network switch, by a monitoring device; and determining, based on the OTA ROM data being delivered to the OTA update target controller, a presence of an abnormality in the OTA ROM data, according to the monitored traffic measurement value of each of the ports and information regarding communication processed by the network switch, by a controller, the OTA ROM data being predefined and stored in a storage, and wherein determining the presence of an abnormality in the OTA ROM data includes:

determining reference traffic for each port based on the information regarding communication processed by the network switch; and determining a presence of an abnormality in data packet traffic of each of the one or more ports by comparing the traffic measurement value and the reference traffic to thereby determine the presence of the abnormality in the OTA ROM data.

12. The method of claim 11, wherein determining the reference traffic for each port includes:

calculating, by the controller, first reference data packet traffic for each of the one or more ports, based on the information regarding the communication processed by the network switch, the OTA ROM data being stored in the storage, and determining the first reference data packet traffic as the reference traffic.

13. The method of claim 12, wherein calculating the first reference data packet traffic for each of the one or more ports includes:

calculating, by the controller, the first reference data packet traffic for each of the one or more ports, based on information regarding at least one of (i) a period when data is transmitted between software units of the OTA update target controller connected to each of the one or more ports or (ii) a size of the transmitted data.

14. The method of claim 11, wherein the storage is configured to store first information that defines data packet traffic when the abnormality is not present in the OTA ROM data, and wherein the reference traffic for each port is determined based on the first information.

15. The method of claim 11, wherein the storage is configured to store second information that defines data packet traffic when the abnormality is present in the OTA ROM data, and wherein the reference traffic for each port is determined based on the second information.

16. The method of claim 12, wherein determining the reference traffic for each port includes:

calculating, based on the OTA ROM data not being delivered to the OTA update target controller, second reference data packet traffic for each of the one or more ports; and determining the second reference data packet traffic as the reference traffic.

17. The method of claim 11, further comprising:

mirroring and obtaining, by the controller, information regarding a data packet transmitted and received by a port at which the abnormality in the data packet traffic is determined to be present.

18. The method of claim 11, further comprising:

outputting, based on a determination that the abnormality is present in the OTA ROM data, information regarding the abnormality of the OTA ROM data using an output device provided in the vehicle, by the controller.

* * * * *